Nov. 5, 1935.   C. B. BAILEY   2,019,474
METHOD OF PRODUCING COMPOSITE SHEETS
Filed Aug. 24, 1931   2 Sheets-Sheet 1
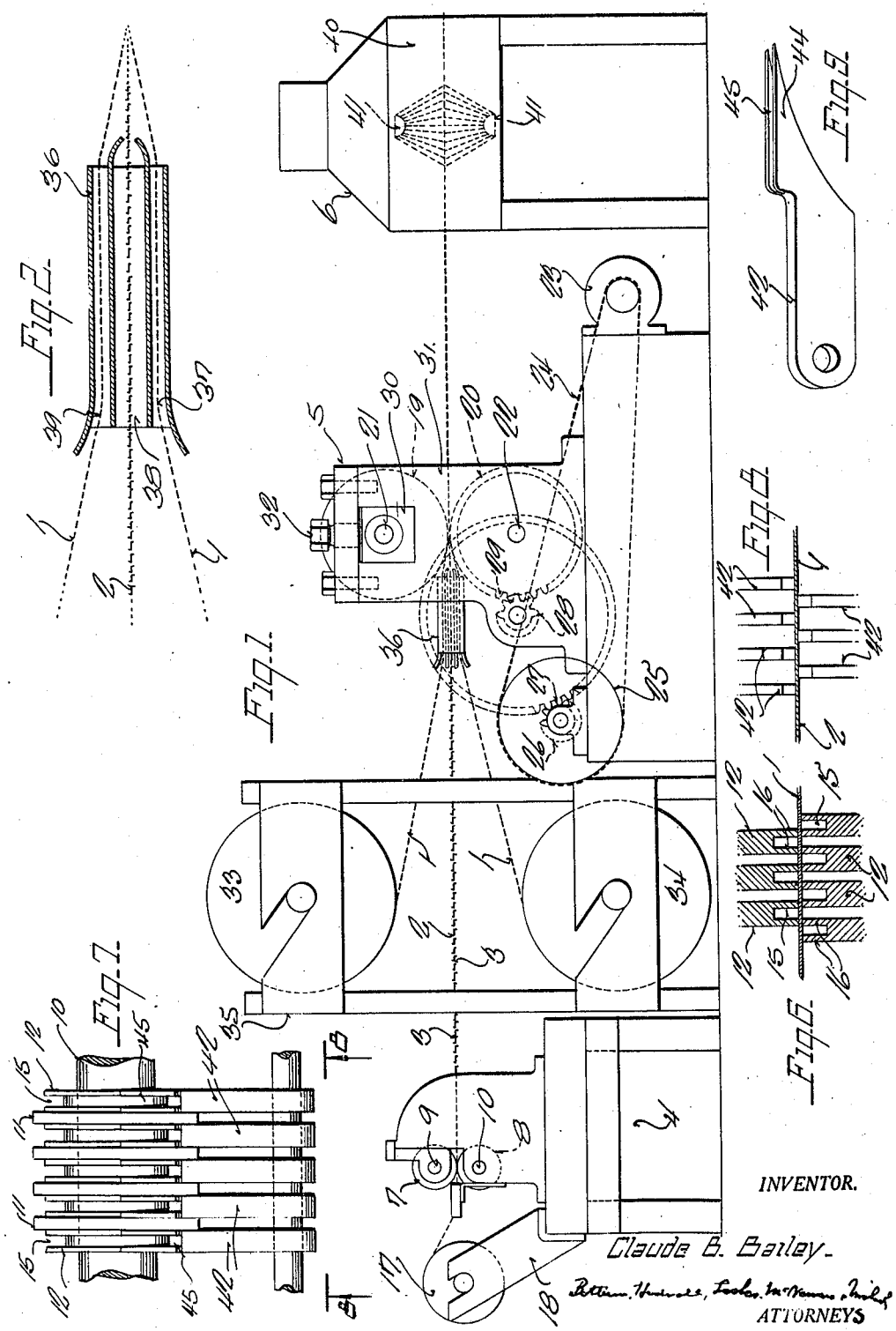
INVENTOR.
Claude B. Bailey
ATTORNEYS Nov. 5, 1935.  C. B. BAILEY  2,019,474
METHOD OF PRODUCING COMPOSITE SHEETS
Filed Aug. 24, 1931  2 Sheets-Sheet 2
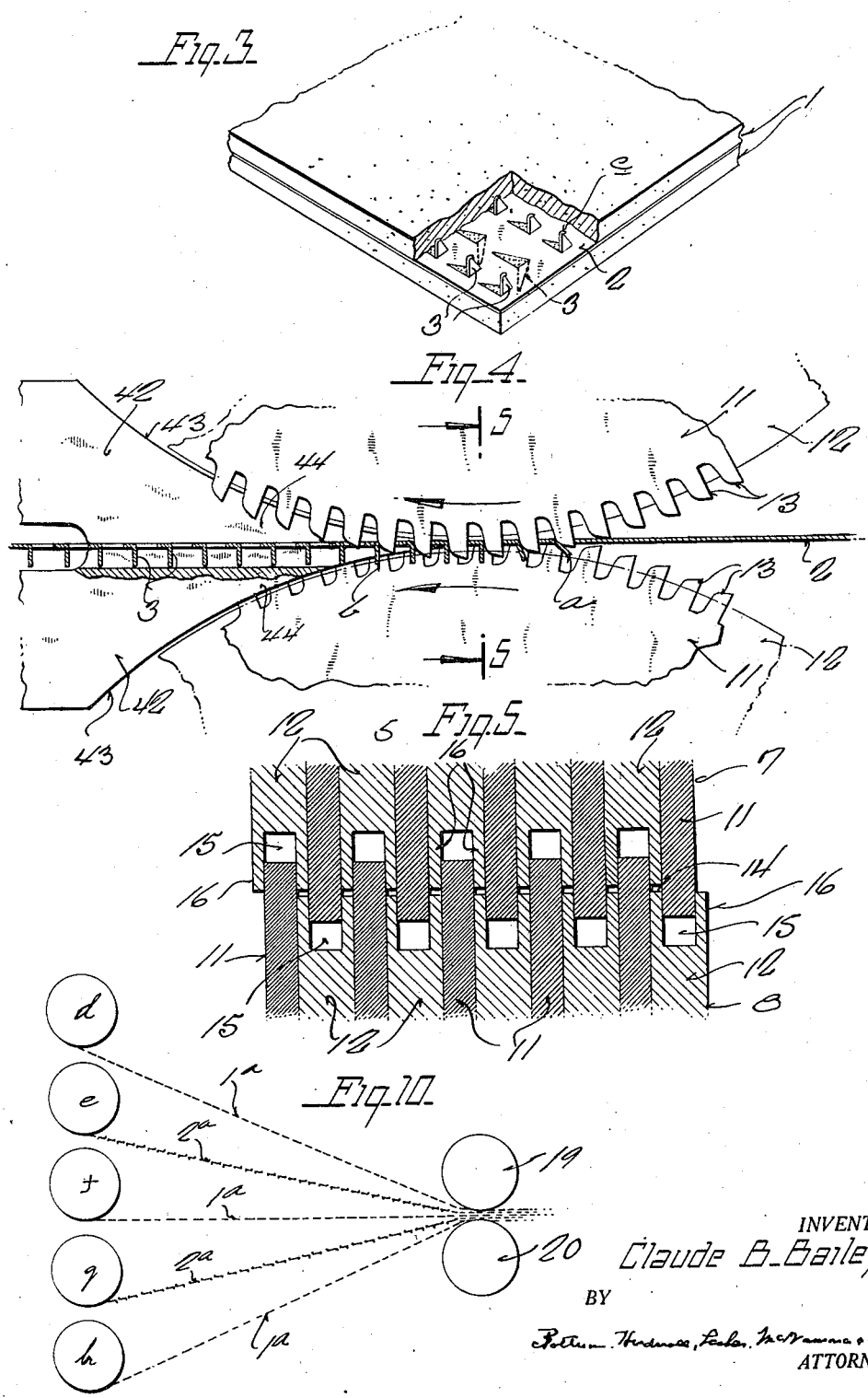
INVENTOR.
Claude B. Bailey
BY
ATTORNEYS Patented Nov. 5, 1935

2,019,474

UNITED STATES PATENT OFFICE 2,019,474

METHOD OF PRODUCING COMPOSITE SHEETS

Claude B. Bailey, Wyandotte, Mich., assignor to McCord Radiator & Mfg. Co., Detroit, Mich., a corporation of Maine Application August 24, 1931, Serial No. 558,856

1 Claim. (Cl. 154—2)

This invention relates to a method and apparatus for making composite sheets for gasket, packing and other purposes.

The composite sheet to which my invention is applicable is composed of layers of non-metallic and metallic sheet material, such as asbestos and steel, with prongs or projections struck out of the metal layer or layers and extending into or embedded in the non-metallic layers for securing or anchoring the layers together in co-extensive and overlapping relation.

The main object of the invention is to provide an improved method and apparatus whereby the layers making up the composite sheet may be fed into the assembled relation desired from a source of supply and then be pressed together at the pressure required for their intimate connection in one continuous and uninterrupted operation, which may be followed by any desired other operations, as by rolling the produced sheet into reel or roll form for future use or by feeding the sheet directly into a press for blanking or cutting gaskets of the desired size and shape therefrom.

Another object of the invention is to have the prong producing operation precede the layer pressing operation in such manner that the composite sheet may be produced from start to finish in one continuous and uninterrupted operation.

A further object of the invention is to press the layers together by a rolling action, as by the use of pressure rolls, which not only enables considerable pressure to be applied on the layers for forcing them together into intimate contact, but establishes the feed for the apparatus by drawing the layers into the rolls and moving the formed sheet therefrom.

A further object of the invention is to coat the sheet as it is formed with graphite or other material which will prevent the outer surfaces of the sheet from adhering together when rolled into reel form or when clamped between joint forming members.

The invention also relates to the cutters, spacers and strippers of the prong producing part of the apparatus, and consists further in the matters hereinafter described and claimed.

In the accompanying drawings—

Fig. 1 is a diagrammatic view of the apparatus for carrying out the method of my invention;

Fig. 2 is an enlarged longitudinal sectional view of the layer guide and separator employed in the apparatus;

Fig. 3 is a perspective view, with one of the layers broken away, of the composite sheet produced by the apparatus and method of my invention;

Fig. 4 illustrates the action of one of the cutters in that part of the apparatus where prongs are provided on the metal layer;

Fig. 5 is a longitudinal sectional view taken on line 5—5 of Fig. 4;

Fig. 6 is a similar sectional view illustrating how the metal layer is supported while being provided with prongs;

Fig. 7 is a top plane view of a group of strippers to be hereinafter described;

Fig. 8 is a view of the strippers taken on line 8—8 of Fig. 7;

Fig. 9 is a perspective view of one of the strippers; and

Fig. 10 is a diagrammatic view of a form of feed to be hereinafter described.

The composite sheet of Fig. 3 produced by the method and apparatus of my invention comprises three layers, two outer layers 1, 1 of non-metallic sheet material, such as asbestos, and an intermediate layer 2 of sheet metal, such as sheet steel. The layers are co-extensive, overlap and are anchored or secured together by prongs or projections 3, 3 struck out of the metal layer extending into the non-metallic layers. The prongs 3 are long enough to have their outer ends bent into clinching relation with the non-metallic layers when the layers are pressed together in the production of the composite sheet. The outer layers 1 being of yieldable material provide the cushion and seal required for the sheet when used for gasket and packing purposes. Moreover, the layers 1 being of asbestos, enables the sheet to pack points subject to high temperatures, as encountered in the automotive and steam fields. In place of asbestos, any other packing material of a yieldable and refractory nature may be used. The metal layer 2 being of steel has the strength required to support the sheet even though of thin gauge. Moreover, steel enables the prongs 3 struck out from the metal layer to have sufficient strength and rigidity to penetrate the packing layers without collapsing when the layers are forced together into intimate contact by a high pressure when making the completed sheet. Instead of three layers, the sheet may be made of a greater number of layers by merely adjusting and arranging those instrumentalities of the apparatus to accommodate the number of layers required for the sheet to be produced.

As shown in Fig. 1, the instrumentalities of the apparatus for producing the composite sheet, are arranged in such order that the prong provided metal layer 2 is produced in advance of the application thereto of the non-metallic layers 1. The instrumentality for producing the prong provided metal layer 2 is indicated by 4. The instrumentality for pressing the several layers of the sheet together into intimate contact is marked 5, while the instrumentality for coating the outer sides of the completed sheet with graphite or similar material is marked 6.

Instrumentality 4 has a pair of horizontally disposed rolls 7, 8, power driven and arranged one above the other on shafts 9, 10, as shown in Fig. 1. The rolls are geared together for rotation in unison and are made up of alternate cutters 11 and spacers 12, as shown in Fig. 5. The cutters 11 are in the form of discs, keyed to the respective shafts 9, 10, and have peripheral teeth 13 of the shape and size required to provide the prongs 3 on the metal layer 2.

The action of the teeth in producing the prongs is shown in Fig. 4. As illustrated, a tooth on first contact with the blank metal layer 2 punctures the same at the prong, and displaces the portion of the layer making the prong out of the plane of the layer, as shown at $a$ in Fig. 4. As the rotation of the cutter continues in the direction of the arrow in Fig. 4, the tooth is projected farther through the puncture and finally bends the displaced metal into substantially right angular relation to the layer completing the formation of the prong, as shown at $b$ in Fig. 4. At this point, the tooth leaves the layer, having completed its prong producing operation. The following teeth, each produce a prong, all of which are arranged in a row on the metal layer. The cutters of the upper roll 7 provide prongs extending below the layer, while the cutters of the lower roll 8 produce prongs extending above the layer. Each roll is made up of a multiplicity of cutters, to produce a multiplicity of prongs on opposite sides of the metal layers. This distributes the prongs over practically the entire area of the metal layer and thus provides for an effective connection of the layers together through the prongs.

The metal layer 2 while being acted on by the cutters is supported by the spacers 12, which are also in disc form, being keyed to the respective shafts 9, 10, to rotate therewith. The manner in which the spacers 12 support the metal layer 2 is shown in Fig. 6. The cutters are omitted from this figure for the purpose of illustration. The spacers are of such diameter that where their peripheral edges are opposed at the pass between the rolls, there is a space 14 between them to accommodate the metal layer and permit its feed between the rolls. This space is substantially equal to the thickness of the metal layer, so that the latter will not be displaced while being operated upon by the teeth of the cutters. The teeth of the cutters extend beyond the spacers to perforate the layer 2 to produce the prongs 3 thereon. The spacers 12 are wider than the cutters 11 so that separated rows of prongs may be produced on the metal layer. The spacers are provided with peripheral grooves or channels 15 to receive the teeth on the alined cutters 11, as shown in Fig. 5. The walls 16, 16 of the grooves extend to the periphery of the spacers and support the metal layer, as shown in Fig. 6. With the teeth on the cutters fitting and filling the grooves 15 on the associated spacers, the inner edges of the walls 16 serve as cutting edges for the cutters to shear and not tear the metal of the layer 2 along the sides of the prongs in producing the same.

The metal layer 2 in blank or stock form is fed into the space between the rolls 7, 8 from a suitable source of supply located in advance of the rolls, as in roll or reel form, marked 17 in Fig. 1. The reel is supported in front of the rolls 7, 8 on bracket arms 18 as shown.

The instrumentality 5 comprises a pair of horizontally disposed pressure rolls 19, 20 arranged one above the other on shafts 21, 22, as shown in Fig. 1. The prong provided metal layer 2 and the packing layers 1, 1 are fed between these rolls to be pressed together as shown in Fig. 1. The lower roll 20 is power driven from an electric motor 23 mounted on the base of the instrumentality 5. A belt 24 connects a pulley on the armature shaft of the motor with a pulley 25 at the opposite end of the base of the instrumentality 5. Pulley 25 drives a gear pinion 26 which is in constant mesh with a gear wheel 27. Gear wheel 27 drives a pinion 28 which is in mesh with a gear wheel 29 fixed to the shaft 22 of lower roll 20. Upper roll 19 by means of vertical guide-ways 30 in standards 31 at the sides of instrumentality 5 may be set by screws 32 to furnish the pressure desired to press the layers together on passing between the rolls.

The packing layers 1, 1 are fed to the rolls 19, 20 on opposite sides of the prong provided metal layer 2 from a suitable source of supply, as for example, rolls or reels 33, 34 of such material supported for rotation in a frame work 35 located between instrumentalities 4 and 5 as shown in Fig. 1. The perforated metal layer 2 is passed between reels 33, 34 so that the other layers 1 may be fed to the rolls 19, 20 on opposite sides of the metal layer. The several layers are collected and guided to the pass between rolls 19, 20 by a fixture 36, which as shown in Fig. 2, is divided into three passage-ways 37, 38 and 39. The latter are arranged one above the other and guide the layers 1, 2 to the rolls, yet keeping the layers separated and apart until they reach the bite of the rolls. With the layers kept apart, they may individually weave and stretch, without one interfering with the other as pressure is exerted on the layers to unite them at the rolls 19, 20. Considerable pressure is exerted on the layers as they pass between the rolls to bind them tightly together by intimate contact and to also imbed the prongs on the metal layer well in the packing layers. Under this high pressure the outer ends of the prongs are bent over slightly to clinch the packing layers 1 to the metal layer 2, as indicated at $c$ in Fig. 3.

The pressing and clinching action described occurs continuously as the several layers making up the sheet are passed between the rolls 19, 20. Due to the fact that the lower roll 20 is power driven and the rolls press the several layers together with considerable pressure, the layers are drawn into the space between the rolls by the frictional feed on such layers. Moreover, this feed passes the completed sheet beyond the instrumentality 5 to the instrumentality 6 where the sheet is coated on opposite sides with graphite or other paint to prevent the sheet from sticking or adhering to similar sheets or to the surfaces of the members between which the sheet in packing or gasket form is clamped.

Instrumentality 6 comprises a housing 40 through which the composite sheet is fed and contains nozzles or sprays 41, 41 to coat the opposite sides of the sheet with graphite or the like.

The composite sheet passes from the spraying device 6 either to a winding apparatus on which the sheet is wound into roll or reel form for future use or to an automatic press for blanking or cutting gaskets from the composite sheet. The winding device would include a clutch of a character to compensate for the variations in the size of the roll as the material is reeled.

The rolls 7, 8 of the instrumentality 4 are geared or otherwise connected to the main drive of the entire apparatus in order that the feed of the several layers through the machine will be uniform, and thus prevent the movement of one layer at a speed different from that of another.

The method described is entirely flexible in that the entire composite sheet can be made in one continuous and uninterrupted operation, with the sheet either wound into reel form or fed directly into the blanking machine with which the apparatus is usable.

To strip the perforated metal layer 2 from the teeth of the cutters 11, I provide strippers 42, 42 arranged in sets above and below the metal layer on the delivery side of the rolls 7, 8, as shown in Fig. 4. The strippers are disposed between the cutters 11 and curved edges 43 conforming to and fitting against the peripheral edges of the associated spacers 12, as indicated in Fig. 4. The strippers are shaped as in Fig. 9, and have end portions 44 which project into the space between the rolls 7, 8, and guide the metal layer therefrom as the teeth leave the same. With a stripper 42 at each spacer, it is necessary to provide the end portion 44 of each spacer with a slot 45 to receive the teeth on the cutter co-operating with such spacer.

Should it be desired to make a composite sheet with a metal layer on the outer side of a non-metallic layer such as may be required for some forms of packing and gaskets, I need only to replace the cutting discs of one roll with spacer discs and allow the sheet to be perforated by the teeth on the cutters of the other roll.

While I have shown but a single prong for each opening or aperture made in the metal layer by the teeth of the cutters, yet, it is to be understood that my method may be adjusted to provide two prongs, for each opening, as for example, having a prong at both ends of each opening. This can be accomplished by having the teeth on the cutting discs twice as far apart and assembling one disc directly over the opposing one. To make the prongs in one row offset or in staggered relation to the prongs of an adjacent row or rows, the cutters are set on their shafts 9, 10, with one cutter about one half tooth ahead of the other. Each spacer 12 instead of being in one piece, as shown in the drawings, could be made up of three pieces. In this event, two pieces would form the walls 16, 16 and the third piece would form the bottom of the groove 15.

When making a composite sheet of more than three layers, the feed to the pressure rolls 19, 20, will be as in Fig. 10, with a suitable separator and guide fixture or means for the various layers in advance of the rolls. In Fig. 10, the sheet being formed, comprises 5 layers, three packing or asbestos layers 1a, 1a, 1a, and two metal layers 2a, 2a. These layers are arranged with packing layers on opposite sides of each metal layer. The packing layers are fed from rolls d to h, the rolls c and g being of prong provided metal layers.

The method and apparatus of my invention is simple and effective in operation and enables composite sheets of the character described to be readily and easily made.

The details of construction and arrangement of parts shown and described may be variously changed and modified without departing from the spirit and scope of my invention, except as pointed out in the appended claim.

I claim as my invention:

The method of producing by a continuous process a composite gasket sheet composed of outer layers of heat resistant cushion sheet material formed of discrete particles and an insert layer of sheet metal having tangs thereon, consisting in feeding the cushion layers, from points spaced from said metal layer, towards said metal layer initially at a steep angle whereby the tangs of the metal layer are maintained out of particle-removing contact with said cushion layers and thereafter passing the cushion layers between guiding and spacing motion damping means, meanwhile feeding the metal layer towards a pair of pressure applying devices including a roller, and withdrawing said cushion layers from said guiding and spacing means only after said layers have passed a plane substantially tangent to said roller and substantially perpendicular to said metal layer.

CLAUDE B. BAILEY.